Figure 1:
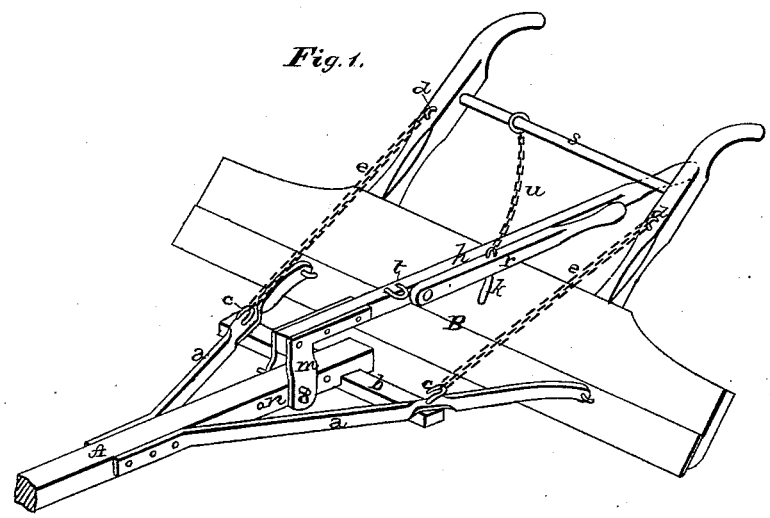
Figure 2:
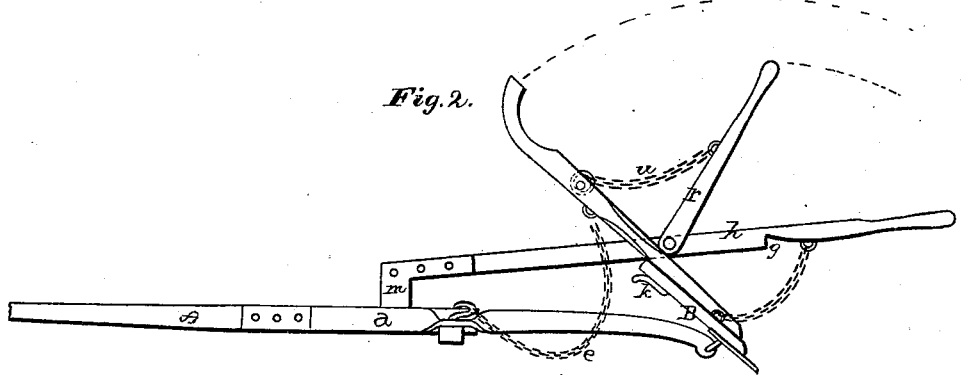

S. ROSSMAN.
Scrapers.

No. 148,987.                           Patented March 24, 1874.

Witnesses.
W. W. J. Murphy.
J. W. Garner.

Inventor.
S. Rossman
per
F. A. Lehmann, Att'y

UNITED STATES PATENT OFFICE.

STEPHEN ROSSMAN, OF GREENVILLE, MICHIGAN.

IMPROVEMENT IN SCRAPERS.

Specification forming part of Letters Patent No. 148,987, dated March 24, 1874; application filed February 18, 1874.

*To all whom it may concern:*

Be it known that I, STEPHEN ROSSMAN, of Greenville, in the county of Montcalm and State of Michigan, have invented certain new and useful Improvements in Road-Scrapers; and I do hereby declare the following to be a full, clear, and exact description of the invention, such as will enable others skilled in the art to which it pertains to make and use it, reference being had to the accompanying drawings, which form part of this specification.

My invention relates to an improvement in road-scrapers; and consists in a peculiar combination and arrangement of levers, chains, and stops, whereby the scraper may easily be drawn back after dumping without stopping the team, and whereby, also, the scraper may be so held as to serve the purpose of a road-leveler.

The accompanying drawing represents my invention.

A represents the tongue of a road-scraper, and B the scraper. Bars $a$ are rigidly attached to the tongue, and by staples movably attached to the scraper, thus allowing the scraper a swinging motion backward and forward, so that it may be set at any required pitch. Crossing the end of the tongue at right angles is a bar, $b$, which gives support to bars $a$. Passing through the ends of bar $b$, and also through the bars resting upon them, are the shanks of hooks $c$, which are bolted or otherwise securely fastened beneath. Extending from hooks $c$ to staples $d$ in the handles of the scraper are chains $e$, which prevent the scraper from falling back too far. The scraper is held in place and kept from dumping by a notch, $g$, in bar $h$, which engages with a suitable stop, $k$, on the upper part of the scraper. By lifting bar $h$ the notch is easily disengaged from the stop, and the load is immediately dumped. Bar $h$ is attached to the tongue, so that it will slide backward or forward, thus altering the relative position of the notch to the scraper, and giving the desired pitch to the scraper. This is accomplished by means of a series of holes, $n$, in the tongue, by a removable pin, $o$, and by lugs $m$, projecting from the end of bar $h$, and arranged to clasp the tongue and slide upon it. In each lug is a hole corresponding in size to the holes $n$. Pivoted midway between the tongue and the scraper, on the bar $h$, is the short bar or lever, $r$, which is connected by a chain, $u$, to the round or cross-bar $s$ of the handles of the scraper. On lever $h$, just in front of the point where the short lever $r$ is pivoted, is a stop, $t$, which prevents the short lever from falling too far forward. By drawing back the short lever, after the dumping has taken place, the handles of the scraper are brought within reach of the operator, and the scraper is again brought into position without impeding the progress of the team.

After the scraper is half-"dumped," by depressing the short bar $r$ as far as the chain will admit, and by holding it down, the road-scraper may be changed into a road-leveler.

The blade of the scraper is always kept sharp, as each side is alternately rubbed or whetted on the ground during loading and unloading, the team being in constant motion.

What I claim, and desire to secure by Letters Patent, is—

1. The scraper B, in combination with bar $h\ g$, lugs $m$, and tongue A, having a series of holes, $n$, in its rear end for adjustment, substantially as set forth.

2. The combination of the bar $h\ g$, lever $r$, and chain $u$, for drawing the scraper back, substantially as specified.

3. The combination of the tongue A, lugs $m$, bar $h$, lever $r$, chains $e\ u$, notch $g$, scraper B, and bars $a$, substantially as shown and described.

In testimony that I claim the foregoing I have hereunto set my hand this 13th day of February, 1874.

STEPHEN ROSSMAN.

Witnesses:
 E. H. JONES,
 JAS. SATTERLEE.